(No Model.)
R. A. BREUL.
SNAP HOOK.
No. 414,011. Patented Oct. 29, 1889.
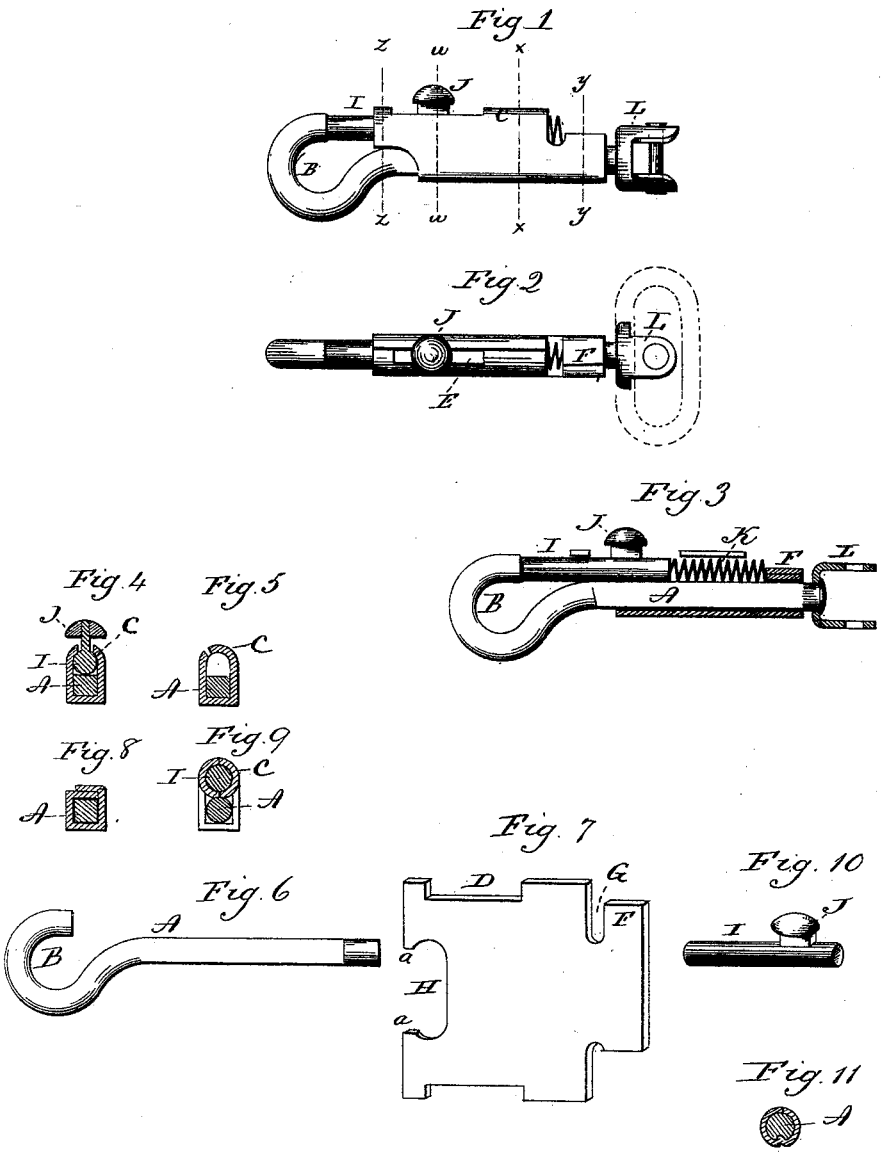
Witnesses
J. H. Shumway
Fred C. Earle
Richard A. Breul
Inventor
By atty.

UNITED STATES PATENT OFFICE.

RICHARD A. BREUL, OF BRIDGEPORT, CONNECTICUT, ASSIGNOR TO THE BRIDGEPORT CHAIN COMPANY, OF SAME PLACE.

SNAP-HOOK.

SPECIFICATION forming part of Letters Patent No. 414,011, dated October 29, 1889.

Application filed April 1, 1889. Serial No. 305,503. (No model.)

*To all whom it may concern:*

Be it known that I, RICHARD A. BREUL, of Bridgeport, in the county of Fairfield and State of Connecticut, have invented a new Improvement in Snap-Hooks; and I do hereby declare the following, when taken in connection with accompanying drawings and the letters of reference marked thereon, to be a full, clear, and exact description of the same, and which said drawings constitute part of this specification, and represent, in—

Figure 1, a side view of the hook complete; Fig. 2, a top view of the same; Fig. 3, a longitudinal central section of the barrel, showing side view of the bolt, spring, body, and hook; Fig. 4, a transverse section cutting on line $w$ of Fig. 1; Fig. 5, a transverse section cutting on line $x$ of Fig. 1; Fig. 6, a side view of the body and hook detached; Fig. 7, a perspective view of the blank for the barrel, detached; Fig. 8, a transverse section on line $y$ of Fig. 1; Fig. 9, a transverse section on line $z$ of Fig. 1; Fig. 10, the bolt detached; Fig. 11, a modification in the interlocking of the blank with the body.

This invention relates to an improvement in that class of snap-hooks in which the tongue or bolt for closing the opening in the hook slides in guides substantially parallel with the body of the hook, the bolt being provided with a thumb-piece, by which it may be withdrawn, and with a spring, the tendency of which is to force it to the closed position, the object of the invention being to construct the hook from wrought metal, whereby it may be made very light and yet strong; and the invention consists in the construction, as hereinafter described, and particularly recited in the claims.

I first form the body and the hook from wire, as seen in Fig. 6.

A represents the body portion of the hook, and B the hook proper. The wire, of a diameter and length according to the size and strength of the hook required, is cut to the requisite length, and the hook bent, leaving the body A substantially straight. The wire is preferably round, but the body A is struck or swaged into square or angular shape, as indicated in Figs. 4, 5, and 6.

The barrel is made from a blank such as seen in Fig. 7. This blank is cut from sheet metal of a thickness corresponding to the strength of the hook required, and is of a width sufficient to surround the angular body portion of the hook, and closed thereon will form the barrel proper C above the body of the hook. This blank, Fig. 7, has upon one of its edges a longitudinal notch D, which, when the blank is closed by the body of the hook, as seen in Fig. 4, will leave a longitudinal slot E on the open hook side of the body. The end of the blank opposite the hook end is formed with an ear F, shaped so as to leave a recess or notch G in that edge of the blank. This ear F is adapted to close down upon the body of the hook at the rear end, as seen in Figs. 2, 3, and 8. At the forward end of the blank a notch H is formed, leaving projecting ears $a$ at each side of the notch. The blank is closed around the body, as before described, the ear F closed down onto the top of the body, so as to interlock with the body. The ears $a$ are turned inward over the body of the hook at the front end, as seen in Fig. 9. The edges of the blank are brought together, as seen in Figs. 2 and 5, and so as to form a tubular chamber on the top of the body. The ears $a$ at the forward end bring that tube at that point into cylindrical shape.

I represents the bolt, which may be also made from wire, corresponding in diameter to the tubular chamber formed by the closing of the bolt around the body. This bolt is seen detached in Fig. 10. It is provided with a thumb-piece J corresponding to the slot E in the tubular portion or barrel of the hook, and is set in place in the assembling of the parts, so that the thumb-piece J will project a sufficient distance through the slot E, and so that the bolt may be moved longitudinally, the thumb-piece working in the slot E. The bolt extends through the forward end of the barrel and so as to abut against the end of the hook, as clearly shown, and as usual in this class of hooks. At the rear of the hook a spring K is introduced into the barrel, which rests against a shoulder formed by the turned-over ear F on the body, as a resistance for the spring, and so that the spring will yieldingly hold the bolt in the closed position, as usual in this class of hooks. The rear end of the hook may be provided with a swivel L, or it may terminate in a loop, as indicated in broken lines, Fig. 2, for the attachment of the strap directly to the body, the construction, however, being specially adapted for the attachment of the swivel. Under this construction the hook may be made extremely light, and yet, being wrought metal throughout, is very strong, so that a great reduction in the weight of the hook may present a strength fully equal to a much heavier hook.

While I prefer to make the body of the hook angular, as a means of interlocking the barrel-blank with the body so that it cannot turn thereon, any suitable interlocking device may be employed—as, for illustration, indentations at some point on the barrel (say on the under side into the body) may serve this purpose, it only being essential that there shall be some interlocking between the barrel and the body.

I claim—

1. The herein-described snap-hook, consisting of a body and hook made from a single piece of wrought metal, combined with a blank of sheet metal closed around said body so as to embrace three sides thereof, leaving a space on the third side to form the bolt and spring-barrel parallel with and above the body, a bolt arranged in said barrel in line with and movable toward and from the nose of the hook, with a spring in said barrel the tendency of which is to hold the hook in the closed position, substantially as described.

2. In a snap-hook, the body and hook made from wire, combined with a barrel made from a blank of sheet metal closed around the body, the edges of the blank brought together and so as to form a barrel parallel with the body of the hook, a notch formed in the edge of the blank, and which, when the blank is closed around the barrel, produces a longitudinal slot D, a bolt I, arranged in said barrel, the bolt constructed with a thumb-piece J extending through the said slot in the barrel, and a spring arranged in the barrel in the rear of the bolt, so as to yieldingly hold the bolt against the nose of the hook, substantially as described.

3. A snap-hook consisting of the body A and hook B, made of wire, combined with a barrel made from a blank of sheet metal closed around the body to form the barrel parallel with the body, the said blank constructed with an ear F at its rear end adapted to be closed upon the top of the body and in rear of the barrel, a bolt I, arranged in said barrel, and a spring also arranged in said barrel and resting against said ear F as a resistance, the said spring adapted to hold the bolt against the nose of the hook, substantially as described.

4. The body A and hook B, made from wire, combined with a blank closed around the said body to form the barrel, the blank constructed with a notch in its edge, which, when the blank is closed around the body and the edges of the blank brought together, will leave a longitudinal slot E into the barrel, the blank also constructed with a notch H at its forward end with inwardly-projecting ears $a$, the said ears turned inward over the body and so as to form a cylindrical end to the tubular barrel, a bolt arranged in the said barrel and extending through the said cylindrical end, the bolt provided with a thumb-piece J, arranged to work in the said slot E of the barrel, and a spring in the barrel at the rear of the bolt, the tendency of which is to yieldingly hold the bolt against the nose of the hook, substantially as described.

RICHARD A. BREUL.

Witnesses:
JOHN CUMMINGS,
J. W. HOYT.